Aug. 24, 1926.

W. CZARSKI 1,597,063

HOUSEHOLD UTENSIL

Filed Sept. 29, 1925     3 Sheets-Sheet 1

Inventor
William Czarski

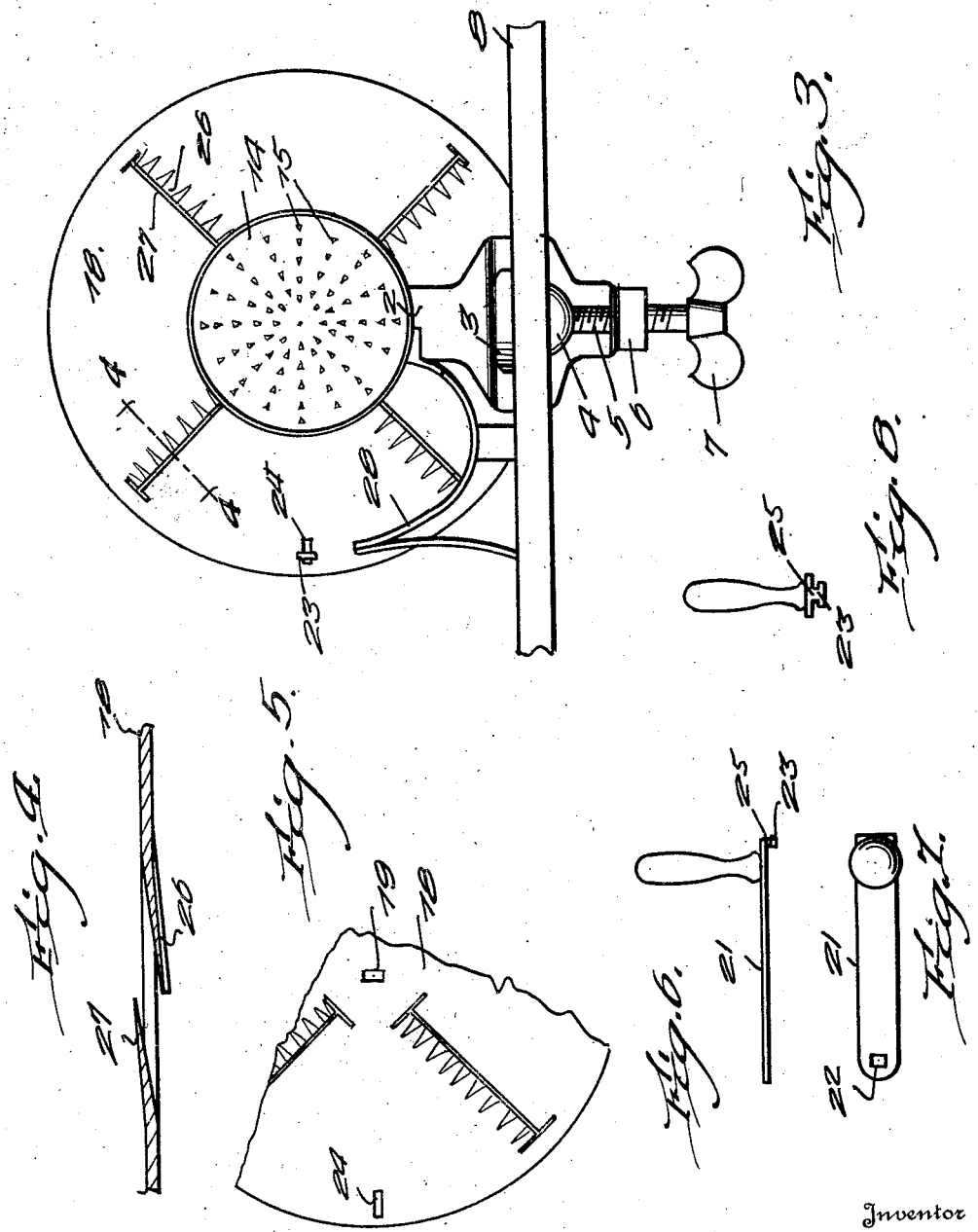

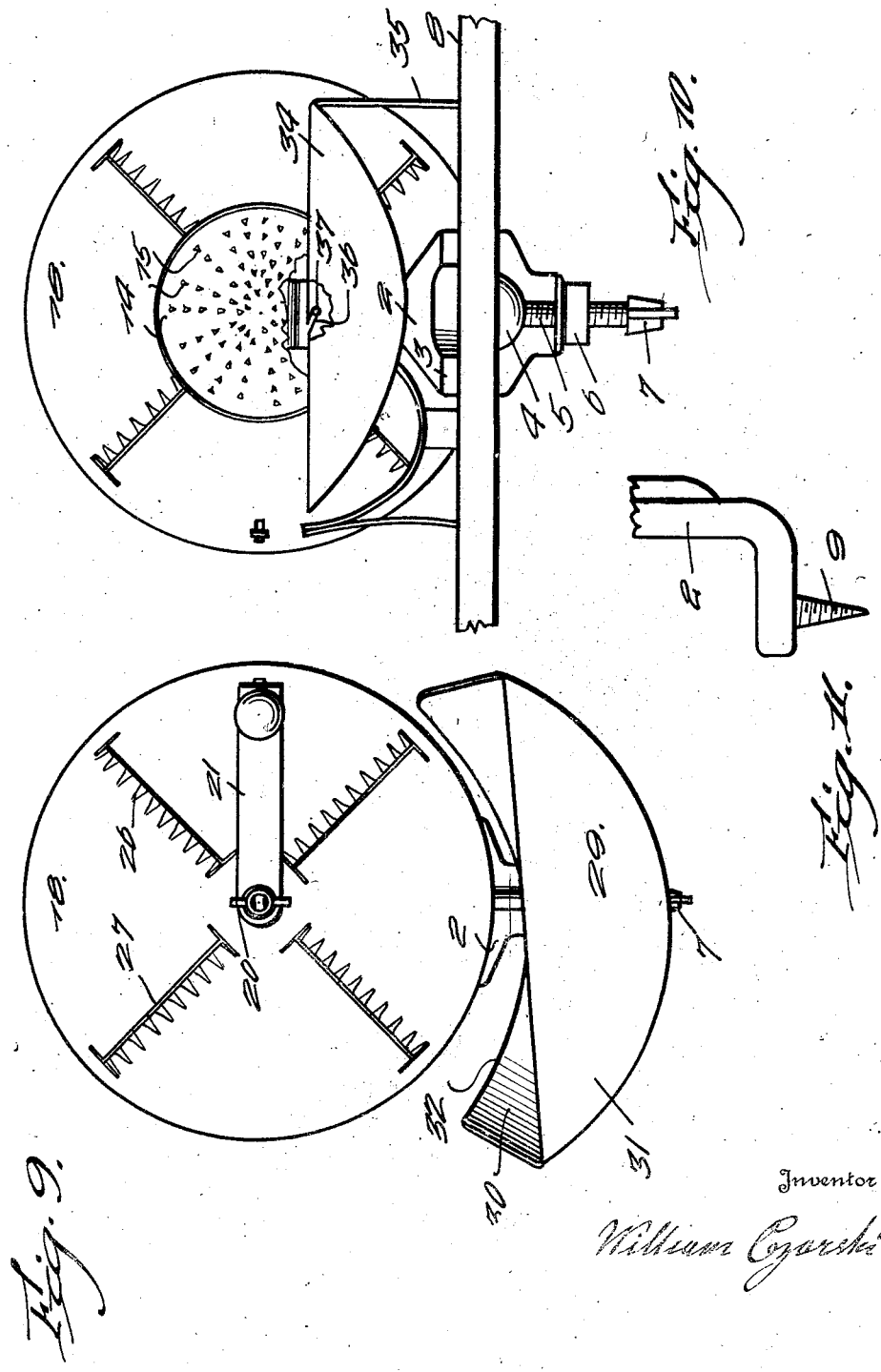

Patented Aug. 24, 1926.

1,597,063

UNITED STATES PATENT OFFICE.

WILLIAM CZARSKI, OF GOLD CREEK, TERRITORY OF ALASKA.

HOUSEHOLD UTENSIL.

Application filed September 29, 1925. Serial No. 59,393.

This invention relates to household utensils and particularly to a combination utility adapted for such purposes as cutting fruits and vegetables and grating cheese, nutmeg, and other articles.

An object of this invention is to provide a device of the character described for slicing vegetables either in plain slices, shoestring, French, curve slices and various other shapes and which may be likewise used for similar operations upon fruits and the like, and which may be used for grating cheese, lemon peel and other articles of a similar character, and which may be used to peel vegetables.

A further object of this invention is to provide a device of this character of a minimum number of parts, which is of simple construction, and in which certain parts perform multiple functions in the different operations and different kinds of cutting desired.

A further object of this invention is to provide a device of this character which is of simple construction, which is simply and easily installed, and which occupies a minimum space, and which is in readiness for various and multiple operations and kinds of duties, which may be easily and quickly manipulated and performs its operation in a rapid manner, and which may be manufactured and sold at a minimum cost.

Figure 2:
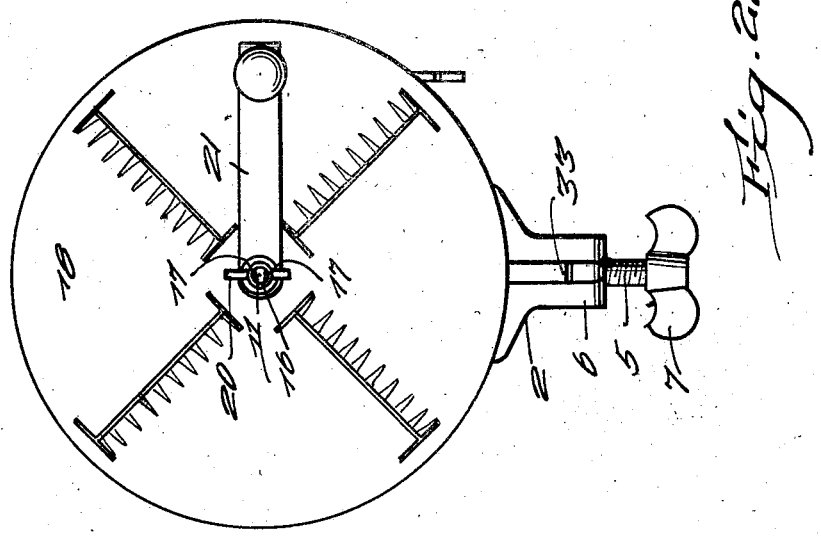
Figure 1:
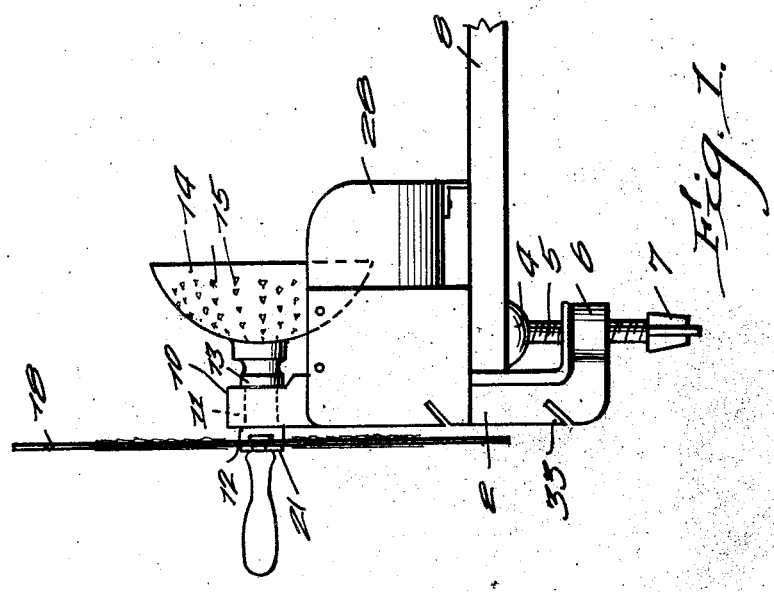

With the foregoing and other objects in view, I have invented the device illustrated in the accompanying drawings, in which:

Figure 1 is a side elevation.
Figure 2 is a front elevation.
Figure 3 is a rear elevation.
Figure 4 is a section at 4—4 of Figure 3.
Figure 5 is a fragmentary showing of the blade disk.
Figure 6 is a side elevation of the crank member detached.
Figure 7 is a top plan view of the showing in Figure 6.
Figure 8 is an end elevation of the showing in Figure 6.
Figure 9 is a front elevation showing the front pan attached.
Figure 10 is a rear elevation showing the rear pan attached.
Figure 11 is a fragmentary showing of a modification of a clamp.

Like reference characters indicate like parts throughout the several views and in the specification, in which there is provided a frame 2, preferably of malleable cast iron, provided with a clamping jaw 3, cooperating with which is a movable jaw 4, preferably of discal shape and carried by a bolt 5, the bolt 5 passing through a lug 6 and being turned by a wing head 7 and being adapted to clamp the frame 2 to a table such as 8, or the device may be provided with a terminating base screw 9, such as shown in the modification shown in Figure 11. The upper part of the frame 2 is provided with a journal 10, in which is mounted a shaft 11 held therein by collars 12 and 13 not in detachable relation to the frame 2. Carried attached to the shaft 11 is a cup-shaped grater 14 provided with inwardly extending grating teeth 15. On the terminal of the shaft 11, opposite to the grater 14, is a screw thread 16, the shaft being cut off or flattened on its opposite sides as at 17 to form a polygonal face.

Detachably connected to the shaft 11 over the polygonal face 17 is a disk 18, the disk 18 being provided wtih a central polygonal aperture 19 fitting over the polygonal portion 17 of the shaft 11 and being held thereon by a wing nut 20, the wing nut 20 also anchoring a crank arm 21, which crank arm 21 is provided also with a polygonal opening 22 like the opening 19 and fitting over the polygonal portion 17 of the shaft 11. The arm 20, as clearly shown in Figures 6 and 8 is provided with a T-shaped end 23 bent over at right angles to its main body portion and adapted to fit within a channel 24, the channel 24 adapted to receive the neck 25 of the T-shaped end 23 and adapted to prevent the T-shaped member from being withdrawn therefrom when the crank arm is radial relative to the disk 18.

In assembling, the T-shaped member 23 is placed in chordal relation to the slot 24, the T-shaped member 23 inserted through the slot 24, and then the member 21 is swung at right angles or in radial relation to the disk 18, whereupon the T-shaped member will be slidable in the slot 24, but will be irremovable therefrom, whereupon the opening 22 is slipped over the shaft 11 and the wing nut 20 is inserted and both the disk and crank are rigidly anchored. The disk 18 is provided, as clearly shown in Figure 4, with double blades, one blade set out on one side, and the other blade set out of the other side, the blades being respectively numbered 26 and 27, the blade 26 being serrated and the blade 27 being plain, there being preferably four pairs of these blades 26 and 27. If the blade 26 faces the article to be shaved or cut, then the serrations will cut the article in a shoestring or serrated style; but if the blades be reversed so that the blade 27 faces the article, then the article will be cut in a plain or chip style. By manipulating the combination arrangement, various other styles of cuts may be had. There is placed in juxtaposition to the blade 18 on the rearward side a semi-circular guide or vegetable holder 28; and in operation, by placing the vegetable or fruit or other article to be cut in this holder and pushing it against the disk 18 and turning the crank 21, the slicing may be had, the slices falling within the pan or receptacle 29, which pan or receptacle 29 is made of sheet metal having an inclined bottom 30 and a side wall 31, the inclined bottom 30 being curvilinear in shape as at 32, and fitting into kerfs or slits 33 upon the frame member 2, being therefore conveniently and readily detachable therefrom. There is further provided a second pan 34 having a depending leg 35, which pan 34 is provided with a kerf 36 detachably fitting over a pin 37, said pin being carried by the rear of the frame 2 and the leg 35 being adapted to normally reach the top of the table, or being co-planar with the face of the jaw 3, whereby the leg 35 will be supported by the table, thereby making a quickly detachable arrangement for receiving the gratings from the grater 14.

Claims:

1. In combination, a disk, a shaft provided with a polygonal end adapted to receive the disk, the disk provided with an eccentric longitudinal channel, a crank member provided with an opening fitting over the polygonal shaft, and provided with a member adapted to be inserted within the longitudinal channel when at an angle relative to the radius and to be retained within the longitudinal channel when the crank is radial to the disk.

2. In combination in a culinary article, a disk provided with a central polygonal opening, a shaft provided with a polygonal end adapted to receive the polygonal opening of the disk, a strap crank member provided with a polygonal opening fitting over the polygonal portion of the shaft, and provided at the other end with a bent-over T-shaped end, the disk provided with an eccentric radial channel adapted to receive the T-shaped end and to retain the T-shaped end when the strap member is radial relative to the disk.

3. In combination in a culinary article, a frame member, a shaft carried by the frame member, a slicer carried by the shaft, a journal carried by the frame member and supporting the shaft, and a pan member detachably connected to the frame member, the pan member including a circular sheet metal member provided with a chordal side and the frame provided with kerfs adapted to receive the base of the sheet metal member.

4. In combination in a culinary article, a frame member, a shaft carried by the frame member, a slicer carried by the shaft, a journal carried by the frame member and supporting the shaft, and a pan member detachably connected to the frame member, the pan member including a pan provided with a depending leg, and the frame being provided with a clamping jaw, the depending leg being substantially co-planar with the clamping jaw.

5. In combination in a culinary article, a frame member, a shaft carried by the frame member, a slicer carried by the shaft, a journal carried by the frame member and supporting the shaft, and a pan member detachably connected to the frame member, the pan member including a pan provided with a depending leg, the frame being provided with a clamping jaw, the depending leg being substantially co-planar with the clamping jaw, the pan being provided with a kerf and the frame being provided with a pin adapted to receive the kerf, the kerf and pin and depending leg cooperating to support the pan.

6. In a device as described a shaft, a cutter disk on one end, a crank member and means for fixing the same to the disk, for positive rotation thereof, said means including a means for binding the crank to the shaft at one end, and an attaching means at the other end thereof, said attaching means consisting of a T-head on said crank member cooperating with a slot in said disk.

In testimony whereof I affix my signature.

WILLIAM CZARSKI.